(12) United States Patent
Goldsmith et al.

(10) Patent No.: US 8,938,317 B2
(45) Date of Patent: Jan. 20, 2015

(54) SYSTEM AND METHOD FOR CALIBRATING LASER CUTTING MACHINES

(75) Inventors: Abraham M. Goldsmith, Boston, MA (US); William S. Yerazunis, Acton, MA (US)

(73) Assignee: Mitsubishi Electronic Research Laboratories, Inc., Cambridge, MA (US)

( * ) Notice: Subject to any disclaimer, the term of this patent is extended or adjusted under 35 U.S.C. 154(b) by 462 days.

(21) Appl. No.: 13/346,809

(22) Filed: Jan. 10, 2012

(65) Prior Publication Data

US 2013/0178972 A1 Jul. 11, 2013

(51) Int. Cl.
*G06F 19/00* (2011.01)
(52) U.S. Cl.
USPC .......................................................... 700/166
(58) Field of Classification Search
CPC .............................. B23K 26/04; B23K 26/421
USPC ........................................................ 700/166
See application file for complete search history.

(56) References Cited

U.S. PATENT DOCUMENTS

| 5,670,068 A | 9/1997 | Kuriyama et al. |
| 6,290,713 B1 * | 9/2001 | Russell ............................ 607/88 |
| 6,615,099 B1 * | 9/2003 | Muller et al. .................. 700/166 |
| 8,492,676 B2 * | 7/2013 | Azuma et al. ............. 219/121.67 |
| 2002/0190435 A1 * | 12/2002 | O'Brien et al. ............... 264/400 |
| 2008/0180657 A1 * | 7/2008 | Scholich-Tessmann et al. ............................. 356/123 |
| 2011/0220623 A1 * | 9/2011 | Beutler .................... 219/121.67 |

\* cited by examiner

*Primary Examiner* — Mohammad Ali
*Assistant Examiner* — Sivalingam Sivanesan
(74) *Attorney, Agent, or Firm* — Dirk Brinkman; Gene Vinokur

(57) ABSTRACT

A system for calibrating a laser cutting machine includes a calibration plate arranged to simulate a workpiece; a first quad photodiode (QPD) and a second QPD for converting light including an image of a portion of a surface of the calibration plate into a plurality of electrical signals, wherein the first and the second QPDs are positioned to receive the light propagated from the surface of the calibration plate through the optical path of the laser beam; and a control system for calibrating the laser cutting machine based on the plurality electrical signals.

14 Claims, 10 Drawing Sheets

SYSTEM AND METHOD FOR CALIBRATING LASER CUTTING MACHINES

FIELD OF THE INVENTION

This invention relates generally to laser cutting machines, and more particularly to calibrating the laser cutting machines.

BACKGROUND OF THE INVENTION

The process of laser cutting uses a laser to cut materials for industrial manufacturing applications, and more recently in academia, small businesses and in the home environment for hobbyists. Laser cutting machines direct a laser at the material to be cut. The material then melts, burns, vaporizes away, or is blown away by a jet of gas, leaving an edge with a high-quality surface finish. Industrial laser cutters are used to cut flat-sheet material, as well as structural and piping materials.

A computer controlled laser cutting machine includes multiple components. In general, these components at least consist of the cutting laser, optics for conditioning and focusing the laser beam, at least one actuator to position the cutting laser, and a computer based controller which commands the actuators to move the cutting laser in such a way as to produce the desired cut pattern.

In practice there is variation in the performance of each component and variation in the way the components are assembled to form the overall machine. These variations can be either static or dynamic for a particular component or complete machine. Static variations remain constant with time. The magnitude of dynamic variations changes over time. All of these variations can produce errors in the position of the cutting laser beam relative to its desired position, and thus produce errors in the final product. It is therefore desirable to have a system and a method for calibrating the laser cutting machine, such that the above errors can be corrected and the accuracy of the machine improved.

In addition to the need for calibration, there is also a need to determine a cutting path of a laser beam, i.e., the path traversed along the work surface by the cutting laser beam during the cutting process. Some types of path errors are only present during full speed operation, such as errors caused by vibrations of the laser cutting machine and errors caused by position control processes. The ability to record the cutting path in real time provides an insight into the dynamics of the system.

The simplest method for measuring an error in the cut path is to measure the cutting path manually. This process is labor intensive, time consuming, and requires expensive measurement equipment. Calibration may need to be performed several times a day due to variations temperature, and manual error measurements can not be made during full speed cutting operations.

One calibration method uses a camera based system for correcting optical path errors. Prior to processing, the laser beam is used to illuminate the area of the workpiece to be processed. The camera records an image, and a controller uses the image to correct the optical path prior to machining. High accuracy can be achieved in this manner, but a large amount of time is wasted by performing a calibration before each cut. In addition, this type of calibration system is not suitable for continuous laser cutting.

Another method uses a camera to calibrate the controller of a laser processing system. The controller commands the deflection system to scan the optical path over a calibration plate while the camera records images of the pattern on the surface of the calibration plate. The images are then processed to determine the error in the optical path, which is in turn used as feedback for the controller to compensate the path. This calibration is performed periodically, at the start of each shift for instance, and is therefore suitable for use in laser processing systems that cut continuously. However, the camera can be expensive, and the image processing is time consuming. The amount of time required to process each image may prevent such a system from being used to record the cut path in real time.

Accordingly, there is a need in the art for a method suitable for calibrating a laser cutting machine. There is also a need to provide such a method that can calibrate the operation of the laser cutting machine during full speed operation.

SUMMARY OF THE INVENTION

It is an object of the subject invention to provide a method for calibration of the laser cutting machine. It is a further object of the invention to determine the path traversed by the cutting laser beam along the work surface in a laser cutting machine. It is a further object of the invention to provide such a method that is suitable for calibration of the laser cutting machine during full speed operation of the laser cutting machine. It is a further object of the invention to provide such a method that determines a cutting path traversed by the laser beam along a surface of a workpiece during its operation.

Some embodiments of the invention include one or combination of the following features. First, an image of the target surface is formed using the same optical path traveled by the laser of the laser cutting machine. Second, a target surface, e.g., a surface of the workpiece, is replaced during the calibration procedure with a calibration plate. Third, the image of the calibration plate is formed on a pair of photoelectric sensors, the electrical signals from which are further processed to ascertain the relative position of the optical path, and thus the path of the cutting beam of the laser on the target surface.

Systems and methods in accordance with various embodiments and implementations of the present invention may offer one or more advantages to users. For example, the embodiment allows to simulate operation of the laser cutting machine such that the calibration of the machine can account for sources of errors, e.g., vibration, present only during the operation. Also, various embodiments can reuse the parts of the laser cutting machine for the calibration purposes reducing the cost of the calibration. Furthermore, the embodiments can use a special quad photodiode in conjunction with specific calibration pattern, which further reduce the cost of calibration.

For example, one embodiment of the invention discloses a system for calibrating a laser cutting machine, including a calibration plate arranged to simulate the workpiece; a first quad photodiode (QPD) and a second QPD for converting light including an image of a portion of the surface of the calibration plate into a plurality of electrical signals, wherein the first and the second QPDs are positioned to receive the light propagated from the surface of the calibration plate through the optical path of the laser beam; and a control system for calibrating the laser cutting machine based on the plurality electrical signals.

Various embodiments use illumination to form an image of a portion of the surface of the calibration plate. The illumination can be provided by the cutting laser itself, by a secondary laser, or another source of the illumination. In the case where the cutting beam is utilized for illumination either the power level is reduced or some other attenuation mechanism is employed to prevent damage to the calibration target. For example, the system may include an attenuator positioned on the optical path to reduce a power of the laser beam; an apodizing filter positioned on the optical path for converting an intensity profile of the laser beam; a diverging lens positioned on the optical path for diverging the laser beam; and a deflector positioned on the optical path for directing the light toward the first and the second QPDs. In other embodiments the illumination is provided by a source that emits light directly onto the surface of the calibration plate, without following the optical path used by the cutting laser.

The image of the portion of the surface of the calibration plate is formed from the light that is modified by the surface. For example, in one embodiment, the light is modified by reflection from the surface. An alternative embodiment, the light is modified when it passes though the calibration target.

The light modified by the surface is collected on an optical path of the laser beam. For example, the light can be directed by the same optics and deflection mechanism(s) that are used to deliver the cutting beam to the workpiece. This light is then focused to form the image of a portion of the surface of the calibration plate on the pair of QPDs. Thus, the image is of the exact location on the calibration plate where the cutting beam would be during a normal cutting operation.

In some embodiments, the system includes a light source for illuminating the calibration plate with the light having a predetermined frequency; and an optical bandpass filter to limit the light impinging on the QPDs to the predetermined frequency.

The surface of the calibration plate includes a calibration pattern of calibration marks arranged on a rectilinear grid. The calibration marks can modify an intensity of the light in a way different from an unmarked part of the surface. For example, in one embodiment either calibration mark or an unmarked part of the surface includes a Lambertian reflector. In another embodiment, the unmarked part of the surface includes opaque material and the calibration mark includes transparent material.

The calibration marks can be circular having a diameter d and are spaced 2d apart in both a horizontal dimension and a vertical dimension. A position of the first QPD can be offset from a position of the second QPD relative to the image of the portion of the calibration plate by m2d+d/2, m=0, 1, 2 . . . , in the horizontal dimension and by n2d+n=0, 1, 2 . . . , in the vertical dimension. Also, a pair of lenses arranged as a Galilean telescope for matching the diameter d of the circular mark in the image of the portion of the calibration plate to a width of each quadrant of each QPD.

The electrical signal generated by each quadrant of the QPD may be converted to a voltage using an amplifier, e.g., a transimpedance amplifier. For example, one embodiment includes a plurality of analog to digital converters for determining digital values corresponding to the plurality of the electrical signals. In one variation of this embodiment, the conversion results in eight discreet voltage signals. These voltage signals are then further converted to digital values using analog to digital converters (ADCs). The eight digital signals are then processed in the digital domain to determine the relative position of the optical path on the calibration pattern. Hence, one embodiment includes a processor for determining, based on the digital values, at least part of a cutting path on the surface of the calibration plate.

Specifically, in some embodiments, the digital values of the first QPD include a value A corresponding to an upper-right quadrant, a value B corresponding to an upper-left quadrant, a value C corresponding to a lower-left quadrant, and a value D corresponding to a lower-right quadrant, wherein the processor combines the digital values to generate a horizontal (X) position signal and a vertical (Y) position signal as a function of the image of the portion of the calibration plate according to X=(B+C)−(A+D)/(A+B+C+D), and Y=(B+A)−(C+D)/(A+B+C+D).

Similarly, the digital values of the second QPD include a value A' corresponding to an upper-right quadrant, a value B' corresponding to an upper-left quadrant, a value C' corresponding to a lower-left quadrant, and a value D' corresponding to a lower-right quadrant, wherein the processor combines the digital values to generate a horizontal (X') position signal and a vertical (Y') position signal as a function of the image of the portion of the calibration plate according to X'=(B'+C')−(A'+D')/(A'+B'+C'+D'), and Y'=(B'+A')−(C'+D')/(A'+B'+C'+D'). Wherein, the signals (X, X') and the signals (Y, Y') are periodic and separated by 90 degrees in phase, thus forming a pair of signals in quadrature.

The processor may determine a length of the cutting path based on a number of cycles in corresponding position signals, and determines a direction of the cutting path based on a phase difference between the corresponding position signals. Also, the processor may interpolate the corresponding position signals to increase a resolution of the length of the cutting path.

Another embodiment describes a method for calibrating a laser cutting machine including illuminating a calibration plate arranged to simulate a position of a workpiece to produce light modified by the calibration plate; converting a portion of the light propagated along an optical path of a laser beam into a plurality of position signals using at least two quad photodiodes (QPDs), wherein the plurality of the position signals includes at least two horizontal position signals and at least two vertical position signals, such that phases of corresponding position signals are offset by 90 degrees; and determining a cutting path including a set of segments, wherein a length of each segment is determined based on a number of cycles in corresponding position signals, and determining a direction of each segment is determined based on signs of the phases of the corresponding position signals.

The method may also include comparing the cutting path with a referenced path to determine an error; and calibrating the laser cutting machine based on the error. In one variation of the method, a surface of the calibration plate includes a calibration pattern of calibration marks arranged on a rectilinear grid, wherein the calibration marks are circular having a diameter d and are spaced 2d apart in both a horizontal dimension and a vertical dimension, and wherein a position of the first QPD is offset from a position of the second QPD relative to the image of the portion of the calibration plate by m2d+d/2, m=0, 1, 2 . . . , in the horizontal dimension and by n2d+d/2, n=0, 1, 2 . . . , in the vertical dimension.

DETAILED DESCRIPTION OF THE PREFERRED EMBODIMENT

Figure 1:
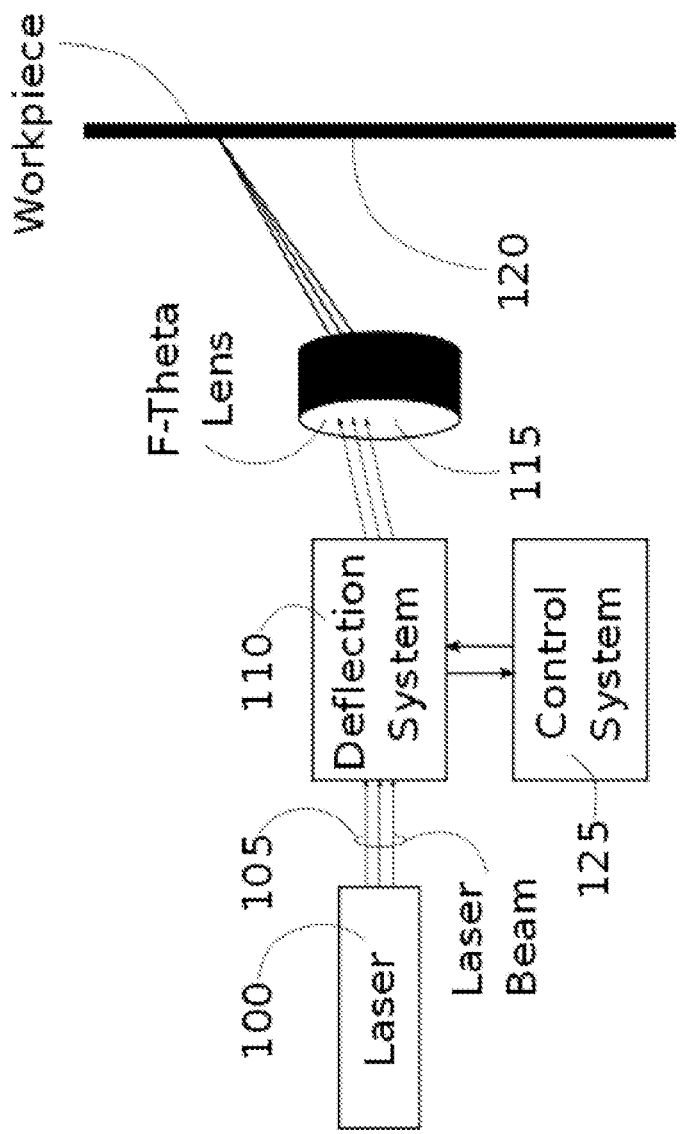
FIG. 1 shows an example of a laser cutting machine to be calibrated.

FIG. 1 shows an example of a laser cutting machine to be calibrated. A laser 100 generates a laser beam 105. The laser beam is directed through a deflection system 110, an f-theta lens 115, and onto the workpiece 120. The deflection system 110 is generally composed of a pair of steering mirrors, each attached to a galvanometer, which allow the laser beam 105 to be directed along the X and Y axis of the workpiece 120. The f-theta lens 115 focuses the laser beam 105 down to a point on the work surface. A control system 125 translates the X Y position commands into currents that are applied to the galvanometer motor coils, which rotate the steering mirrors, and thus guide the laser beam to the desired location on the workpiece 120.

Figure 2:
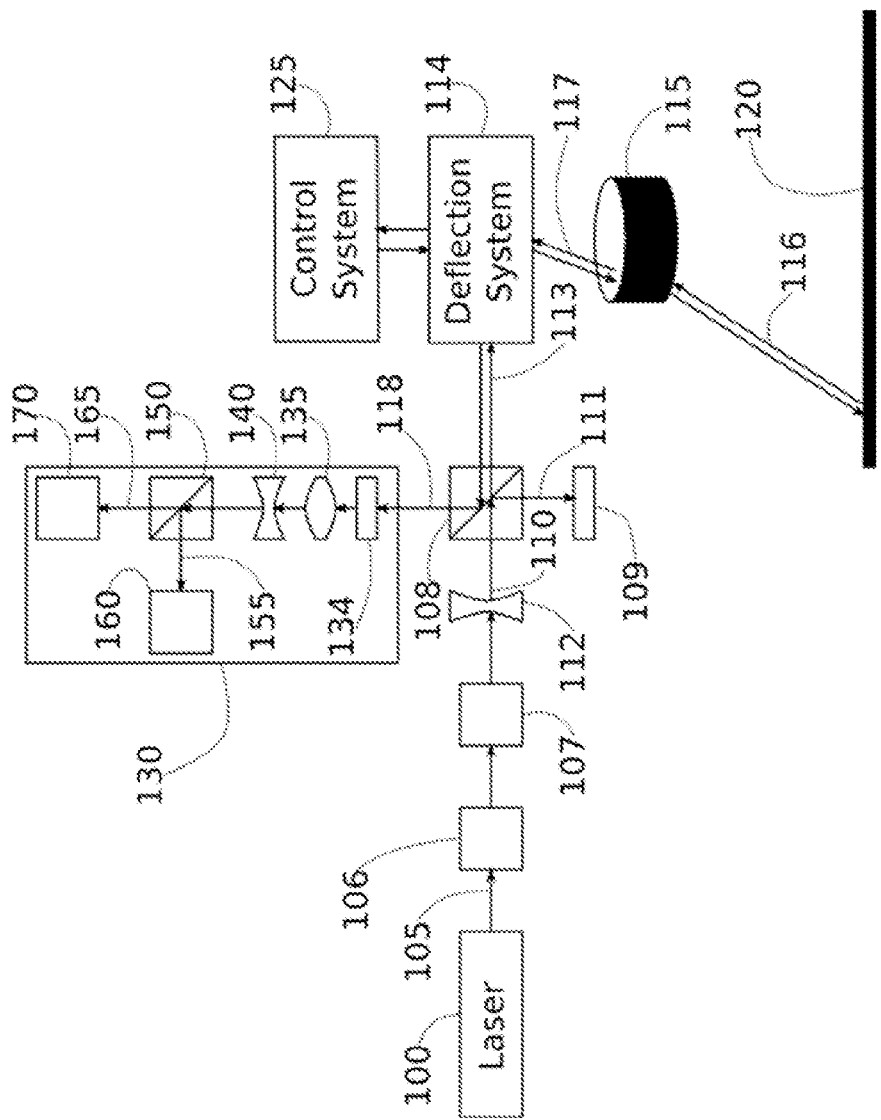
FIGS. 2-4 are schematics of systems for calibrating a laser cutting machine according to various embodiments of the invention.

FIG. 2 shows a system for calibrating a laser cutting machine, such as the laser cutting machine of FIG. 1, according one embodiment of the invention. However, the embodiments of the invention can work with various types of the laser cutting machine. The laser cutting machine of FIG. 1 was shown to simplify the understanding of some embodiments of the invention, and the scope of the invention is not limited by the structure of that machine. A laser 100 generates a collimated laser beam 105. The laser in this embodiment may either be the primary laser used for cutting or a secondary laser used solely for calibration purposes.

In the embodiment that uses the primary laser for calibration, an attenuator 106 may be inserted into the optical path to reduce the power incident upon the calibration surface such that it is not damaged. The laser beam 105 then passes through an apodizing filter 107 for converting an intensity profile of the laser beam to a roughly uniform intensity profile. Laser beam 105 then proceeds through a diverging lens 112 that causes the previously collimated laser beam to become a divergent laser beam 110. A beam splitter 108 is arranged so that the reflected beam 111 is directed into a beam dump 109. The non-reflected portion of the divergent laser beam 113 is guided by the deflection system 114, through a f-theta lens 115, and onto a calibration plate 120 arranged to simulate a workpiece, e.g., is mounted in place of the workpiece.

The surface of the calibration plate 120 can be a lambertian reflector. When the diverging laser beam 113 hits the calibration plate 120, it is reflected back in all directions. A small portion of that reflected light 116 is returned at an angle that allows the f-theta lens 115 to convert the light back to a beam of collimated light 117. The returning beam of collimated light 117 propagates back through the deflection system 114 until the light reaches the beam splitter 108. The deflected portion of the returning beam 118 then enters the calibration optical assembly 130. The calibration optical assembly is completely sealed against outside light except for the beam inlet, inside of which is mounted a band pass filter 134. The bandpass filter prevents light of frequencies other than those in a narrow band around the frequency of the laser itself from entering. Converging lens 135 and diverging lens 140 together form a Galilean telescope used to match the size of the calibration plate surface image to the physical dimensions of the quad photodiodes. After passing through the telescope the light beam hits another beam splitter 150, where the light divided into two sub-beams, 155 and 165, which then impinge on the two quad photodiodes (QPDs), a first quad photodiode (QPD) 160 and a second quad photodiodes (QPD) 170, respectively.

The first and the second QPD are positioned to receive at least portion of the light propagated from the surface of the calibration plate through the optical path of the laser beam light, the light includes an image of a portion of a surface of the calibration plate. The first and the second QPD convert the light into a plurality of electrical signals. A control system 125 calibrates the laser cutting machine based on the plurality electrical signals.

In various embodiments, the elements specific to the calibration system are mounted in such a way that they can be removed from the beam line when the laser cutting machine is not in calibration mode. Specifically, the attenuator 106, apodizing filter 107, diverging lens 112, beam splitter 108, and calibration plate 121, are, e.g., manually or automatically, installed in the system for the purpose of calibration and then removed to allow the machine to process material.

The advantage of this embodiment is that there is a large amount of optical power available in the cutting laser to illuminate the surface of the calibration plate. In general, the amount of light reflected off of the calibration plate that makes it back into the optical path can be quite small. The ecutting or another laser has more than enough power ensure an adequate amount of light returns along the optical path.

Figure 3:
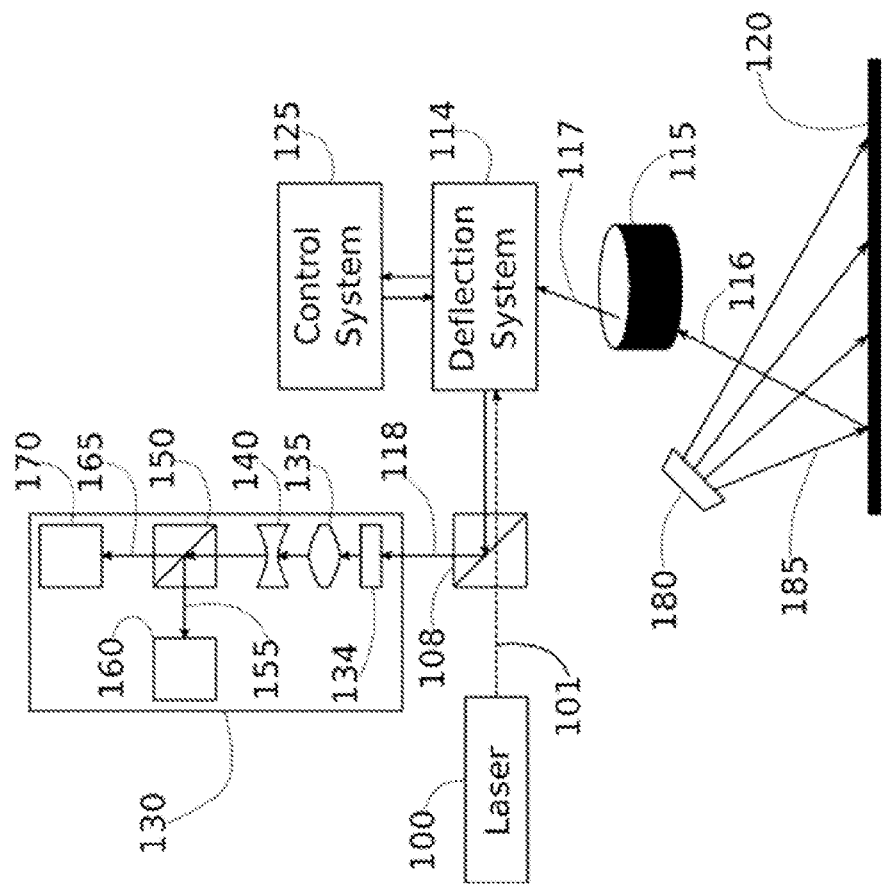

FIG. 3 shows a laser cutting machine including another embodiment of our invention. In this embodiment, a flood lamp 180 replaces the laser 100 as the light source used to illuminate the calibration plate 120. Light from the flood lamp 185 reflects off of the calibration plate and a small portion of the light 116 entered the f-theta lens 115 and proceeds back up the optical path as in the previous example. The advantage of this embodiment is that it is less complex that the embodiment in FIG. 2. The use of a separate means of illumination eliminates the need for the attenuator, apodizing filter, beam splitter, beam dump, and diverging lens present in FIG. 2.

Figure 4:
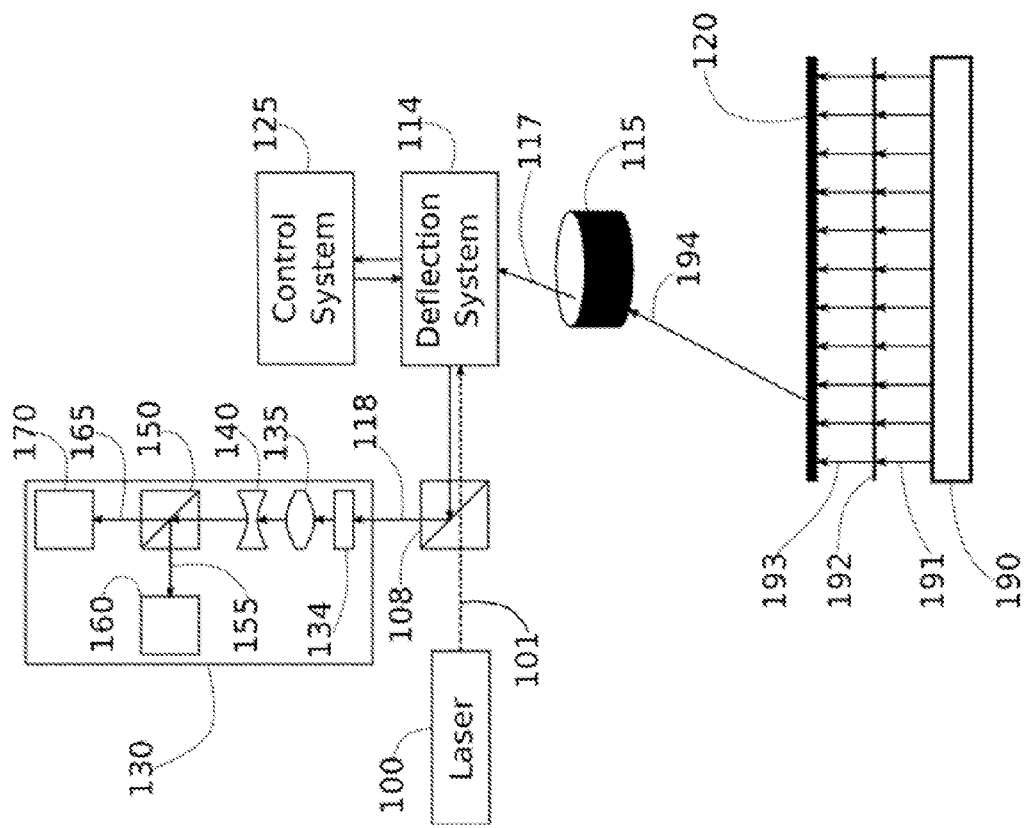

FIG. 4 illustrates another alternative method of illuminating the calibration plate. In this embodiment, the back side of the calibration plate 120 is illuminated by an illumination unit 190, which can include one or a multitude of light emitting elements. The illumination unit emits light 191 that impinges upon a diffuser 192. The diffused light 192 then proceeds to illuminate the back side of the calibration plate 120. The calibration plate includes on opaque material having a regular pattern of transparent holes. Light that is not blocked by the calibration plate proceeds through the f-theta lens and back through the rest of the optical system, as shown in FIG. 2. By not relying on lambertian scattering to return light to the optical path, this embodiment makes better use of the available illumination. This lowers the amount of illumination required to the point that light emitting diodes can be used as the light source. LED illumination is much more efficient than lamp illumination mechanism of the embodiment in FIG. 3. The advantage of this embodiment is that it combines the lower complexity of the embodiment of FIG. 3 with a higher efficiency illumination source.

Figure 5:
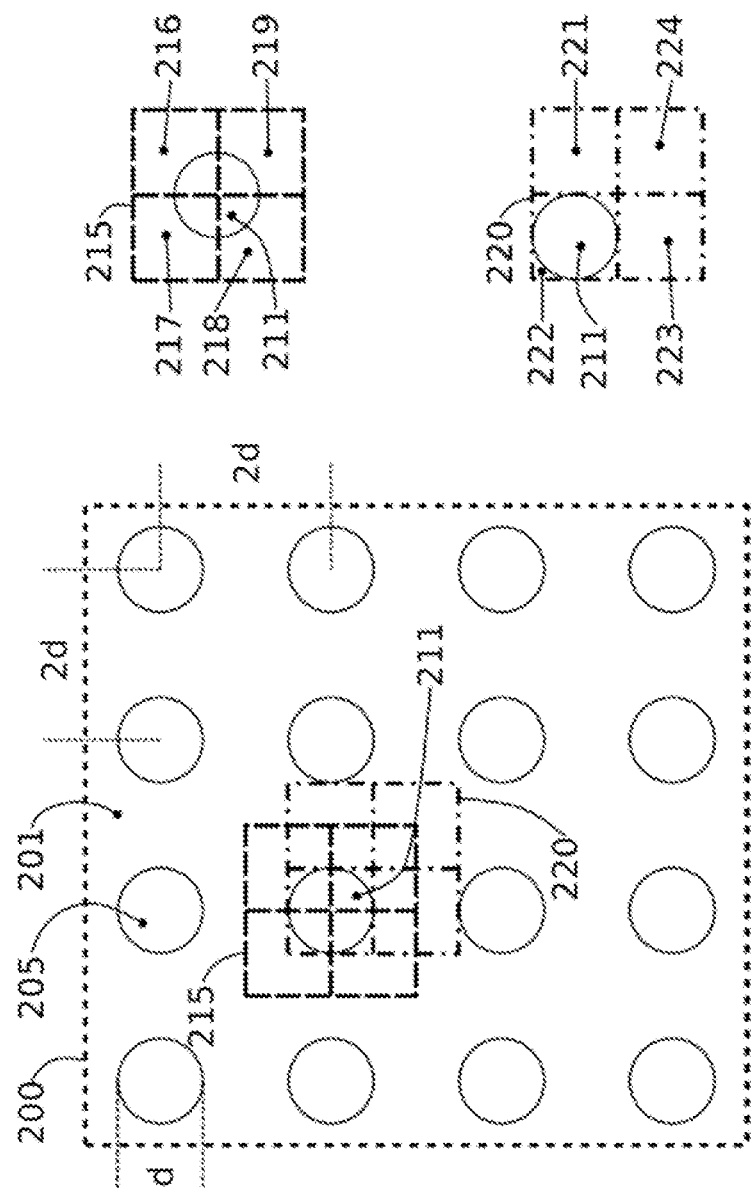
FIGS. 5-8 are schematics of various sections of calibration surfaces according to various embodiments of the invention.

FIG. 5 shows a section of the calibration plate 200. Circular regions 205 of diameter d are located on a rectangular grid with a center to center spacing of 2d in both the horizontal and vertical directions. Although the system works over a wide range of diameters d, one embodiment uses a value of 1 mm. A first QPD 215 and a second QPD 220 are arranged such that they are offset by d/2 in both the horizontal and vertical dimensions. The quad photodiodes do not actually reside on the surface of the calibration plate. The purpose of including them in this figure is to show which parts of the calibration plate are imaged back onto each QPD through the optical system. QPD 215 and QPD 220 are redrawn on the right hand side of the figure for the purposes of clarity. In this example, a region 211 is the only non-reflective region that is within the field of view of the QPDs. The physical offset between QPD 215 and QPD 220 causes the image of the circular region to appear in a different location on each QPD. Each QPD is separated into four quadrants, each of which acts as an individual photodiode. The first QPD 215 includes quadrants A 216, B 217, C 218, and D 219. The second QPD 2 220 includes quadrants A' 221, B' 222, C' 223, and D' 224.

The QPD is essentially a single photodiode that has been cut vertically and horizontally to form four individual, symmetrical, photodiodes attached to the same substrate. Each of the four elements generates an electrical signal proportional to the amount of incident light. Therefore, QPD has four discreet outputs. QPDs have several characteristics that make them preferable to assembling a similar detector from discreet photodiodes. First, the relative alignment of the quadrants is nearly perfect because they are cut from a single device, on a common substrate, using high precision semiconductor manufacturing techniques. Second, the responsivity, i.e., the amount of current generated for a given amount of light incident upon the device, is uniform across the four photodiodes because they were manufactured at the same time. For a similar detector constructed from four separately manufactured photodiodes, the responsivity could vary significantly between them. Third, it is cheaper to purchase a QPD than to build one from four discreet photodiodes.

Figure 6:
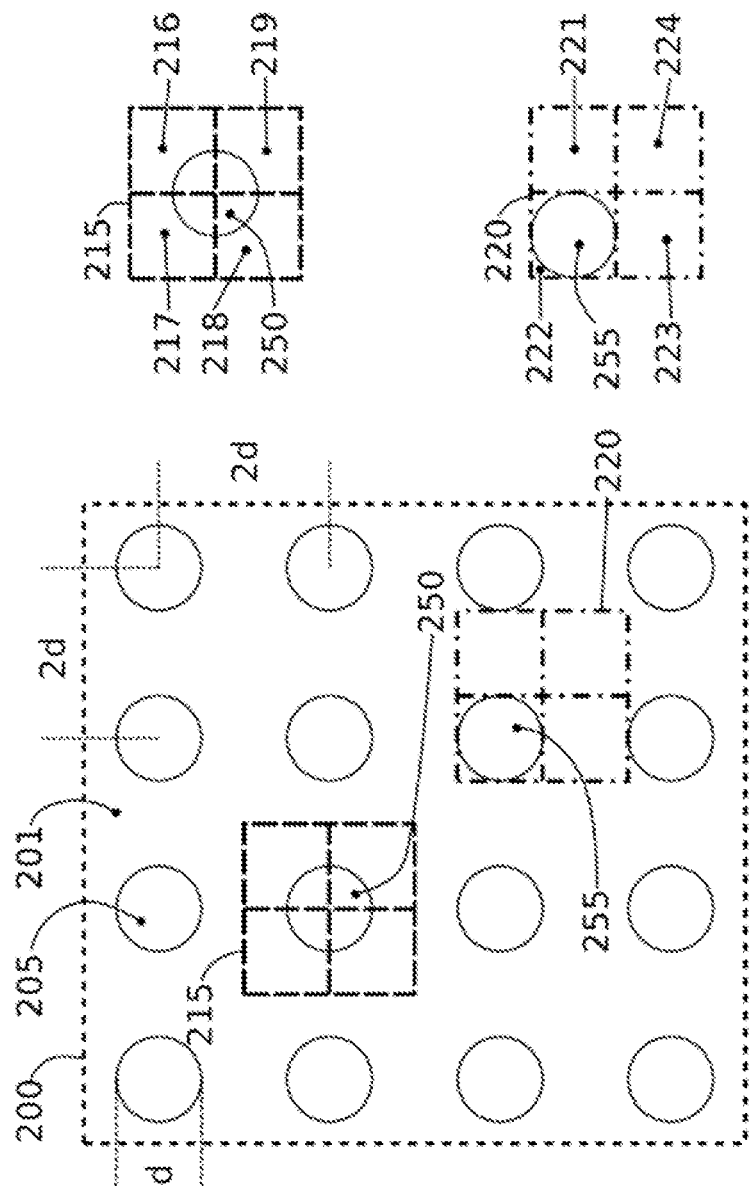

FIG. 6 shows the calibration plate 200 illustrating an alternative arrangement of the QPDs. The calibration plate is identical to that described in FIG. 3. In this alternate embodiment of the invention, QPD 1 215 and QPD 2 220 no longer image an overlapping region of the calibration plate. Instead, they are physically located so as to be offset by the quantity n2d+d/2, n=0, 1, 2 . . . in the vertical direction and m2d+d/2, m=0, 1, 2 . . . in the horizontal direction. The case illustrated here is n=m=1, however in the general case n does not need to equal m. The case with n=m=0 gives the case illustrated in FIG. 5. QPD 215 and QPD 220 are redrawn on the right hand side of the figure for the purposes of clarity. Circular region 250 is imaged onto QPD 1 215 and circular region 255 is imaged onto QPD 2 220. Note that the images of 250 and 255 do not fall in the same location on the QPDs because of the physical offset between them.

In various embodiments, the surface of the calibration plate includes a repeating pattern uniform in both the X and Y directions. In embodiments in which the illumination mechanism is reflective the elements of the pattern are either reflective or non-reflective. In embodiments in which the illumination mechanism is transmissive the elements of the pattern are either transmissive or opaque. When the optical path is scanned over the calibration target the image formed on the QPDs also moves. As the image interacts with the elements of the QPDs the photocurrent generated by each element varies. After being converted to digital quantities, the four outputs of each QPD are combined to create a quantity that represents the position of the calibration pattern relative to the QPD for the x and y directions individually. As the image moves over the QPD in the X and Y directions, the X and Y position signals vary periodically. One electrical period of the position signal corresponds to motion over one cycle of the calibration pattern. Thus, by counting the number of electrical cycles in the position signals it is possible to calculate the distance traveled by the optical path over the calibration pattern.

In one embodiment, the two QPDs are arranged such that the image formed on the second QPD is offset from that formed on the first QPD by one quarter of the pitch of the calibration pattern in both the x and y directions. In other embodiments, the offset is ¼ plus any integer, i.e., a member of the sequence ¼, 1¼, 2¼, 3¼, . . . . The X and Y offsets can be same or different. With the offset between the QPDs is set in this manner, the periodic X and Y position signals have a 90 degree phase offset between them. That is, corresponding X position signals of the first and the second QPDsI have a 90 degree phase offset and the corresponding Y position signals also have a 90 degree phase offset. The sign of the phase offset is used to determine the direction of motion. For example, when the X position signal of the first QPD leads the corresponding X position signal of the second QPD, the direction is positive. When the X position signal of the first QPD lags the X position signal of the second QPD the direction is negative. The same holds true for Y direction of the corresponding Y position signals. Furthermore, the 90 degree phase relationship allows for interpolation between the signals to improve the resolution of the measurement beyond what is achievable by counting complete cycles of the individual signals.

Figure 7:
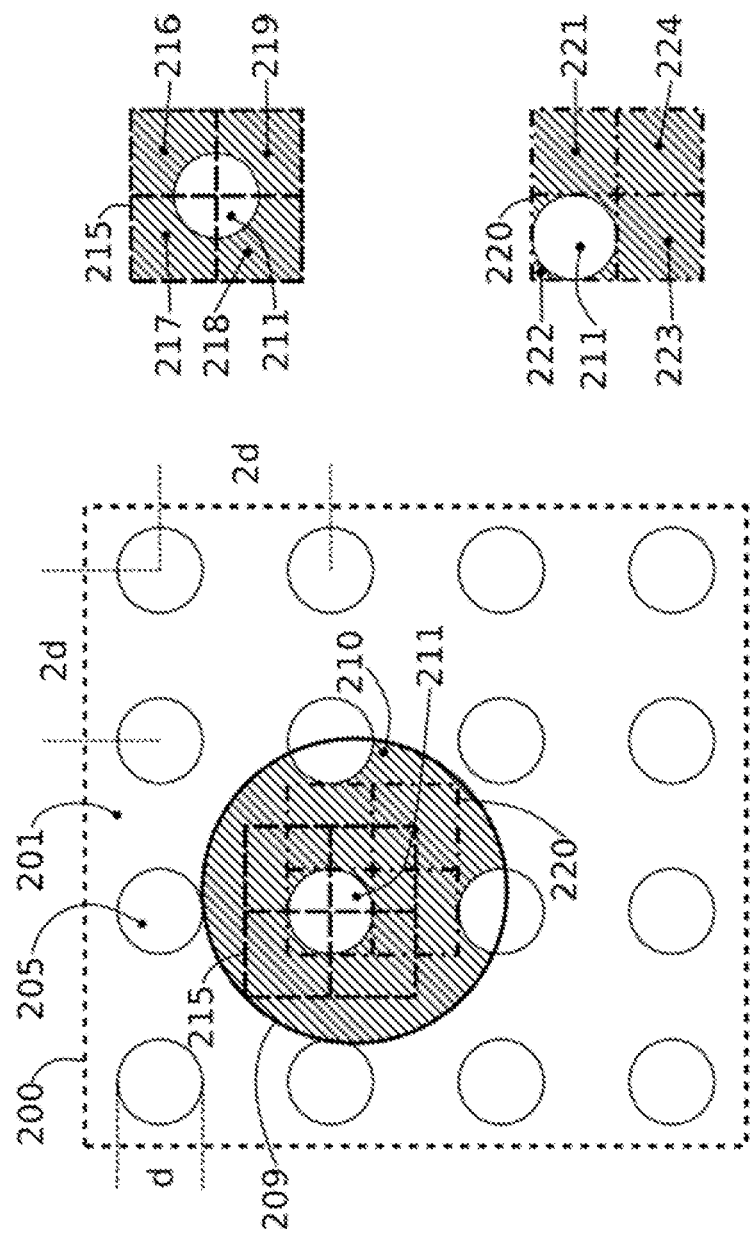

FIG. 7 shows a section of the calibration plate 200 illustrating another embodiment of the invention. In this embodiment, the surface of the calibration plate is illuminated from above. The circular regions 205 represent holes that have been made in the base material 201 of the calibration plate, such that it is perforated. The surface of the base material is finished to produce a lambertian scatterer. In another embodiment, the circular regions 205 represent areas where a coating has been applied to a substrate that is otherwise a lambertian scatterer. One example of the latter embodiment is a sheet of white paper with black circles printed on it. Regardless of the embodiment, the important characteristic is that the base material is 201 is a lambertian scatterer of light incident upon it from above while the circular regions 205 absorb, or a least do not reflect, any of the light incident upon them from above.

Region 209 is the smallest region of the surface illuminated from above in order to form an image on the first QPD 215 and the second QPD 220. If the two QPDs are further separated, such as in the embodiment of FIG. 6, then a correspondingly larger area of the surface is illuminated. Relatively small regions of illumination correspond with versions of the system that use a laser to illuminate the calibration surface by guiding it through the deflection system. If one embodiment, e.g., using an external source of the illumination, the region 209 is expanded to include the entire working area of the f-theta lens. The shaded region 210 represents the portion of the calibration plate that is reflecting light back up the optical path, and thus onto the QPDs. Circular region 211 is not shaded to illustrate no reflection of the light back up the optical path. In the drawings of the first QPD 215 and the second QPD 220 on the right side of the FIG. 7, the shaded regions receives light reflected off of the surface of the calibration plate. The image of circular region 211 corresponds to an area on each QPD that receives no reflected light.

Figure 8:
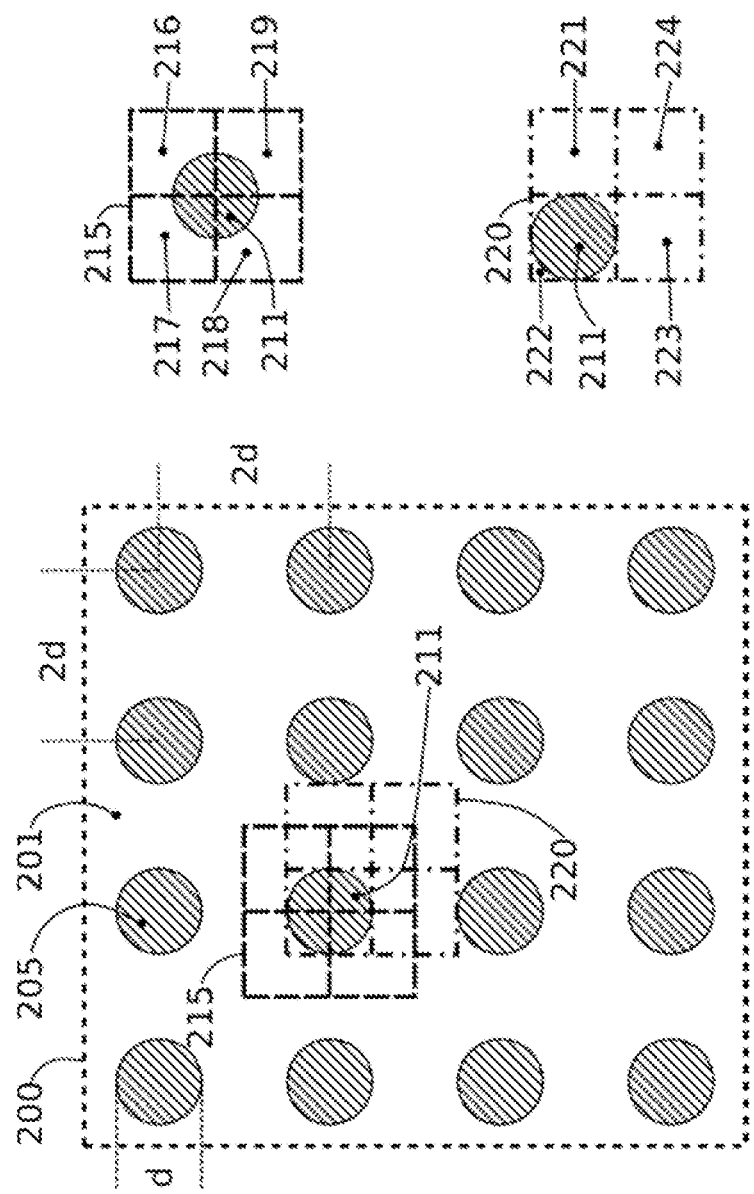

FIG. 8 shows a section of the calibration plate 200 of an embodiment that illuminates the surface of the calibration plate from below. The circular regions 205 represent holes that have been made in the base material 201 of the calibration plate, e.g., using a perforation. The base material 201 is opaque. In this embodiment of the invention, the calibration plate must be illuminated over the entire working area of the f-theta lens. Light coming from below is blocked by the opaque base material 201 of the calibration plate but passes through the transparent shaded regions. This light then continues up the optical system to impinge upon the first QPD 215 and the second QPD 220. The image of circular region 211 is thus formed on the surface of the QPDs as shown on the right side of the figure. The shaded region on each QPDs are illuminated. The unshaded regions receive little or ideally no light.

Figure 9:
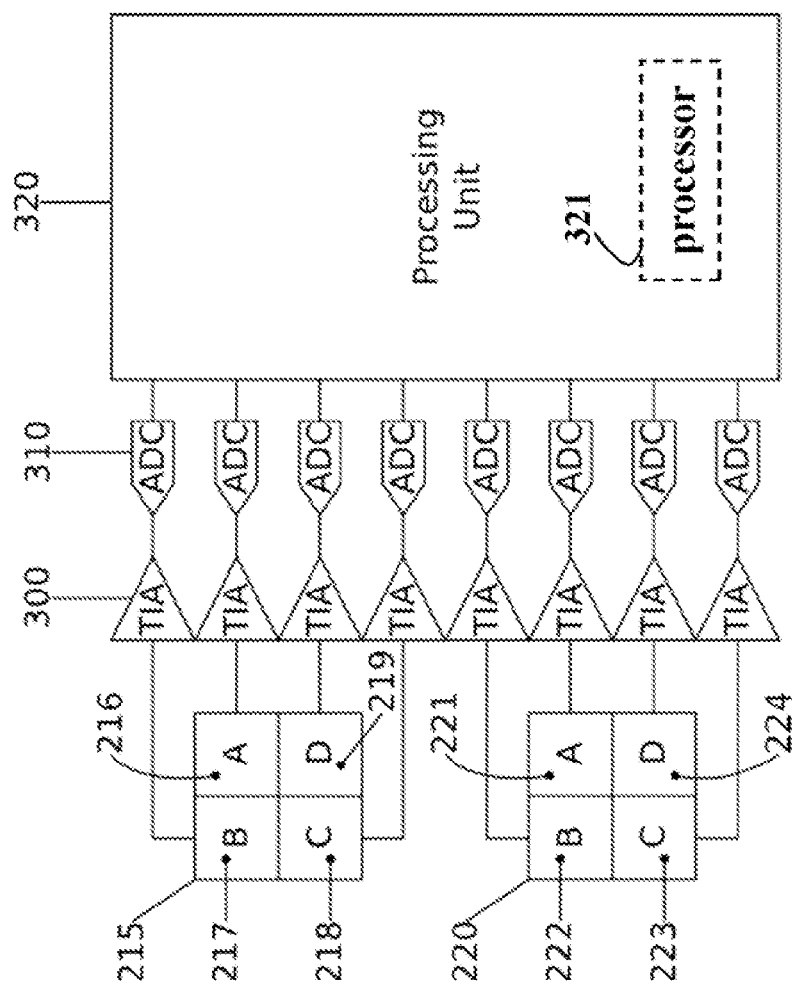
FIG. 9 is a schematic of operation of quad photodiodes and their associated signal conditioning and processing circuitry in accordance with one embodiment.

FIG. 9 shows a first QPD 215 and a second QPD 220, and their associated signal conditioning and processing circuitry in accordance with one embodiment. Each quadrant of the QPD produces a current proportional to the amount of light incident upon it. This current flows into a transimpedance amplifier (TIA) 300 where the current is converted into a voltage. The voltage is then converted into a digital value by an analog to digital converter (ADC) 310. A processing unit 320 can be a digital computer including a processor 321 that takes the digital values from the ADCs as inputs, and determines the position of the optical path on the calibration surface.

For example, the digital values of the first QPD include a value A corresponding to an upper-right quadrant, a value B corresponding to an upper-left quadrant, a value C corresponding to a lower-left quadrant, and a value D corresponding to a lower-right quadrant. The processor combines the digital values to generate a horizontal (X) position signal and a vertical (Y) position signal as a function of the image of the portion of the calibration plate according to $$X=(B+C)-(A+D)/(A+B+C+D), \text{ and}$$

$$Y=(B+A)-(C+D)/(A+B+C+D).$$

Similarly, the digital values of the second QPD include a value A' corresponding to an upper-right quadrant, a value B' corresponding to an upper-left quadrant, a value C' corresponding to a lower-left quadrant, and a value D' corresponding to a lower-right quadrant. The processor combines the digital values to generate a horizontal (X') position signal and a vertical (Y') position signal as a function of the image of the portion of the calibration plate according to $$X'=(B'+C')-(A'+D')/(A'+B'+C'+D'), \text{ and}$$

$$Y'=(B'+A')-(C'+D')/(A'+B'+C'+D').$$

In various embodiments, the signals (X, X') and the signals (Y,Y') are periodic and separated by 90 degrees in phase, thus forming a pair of signals in quadrature. The processor determines a length of each segment of the cutting path based on a number of cycles in corresponding position signals, and determines a direction each segment of the cutting path based on a phase difference between the corresponding position signals. In one embodiment, the processor interpolates the corresponding position signals to increase a resolution of the length.

Figure 10:
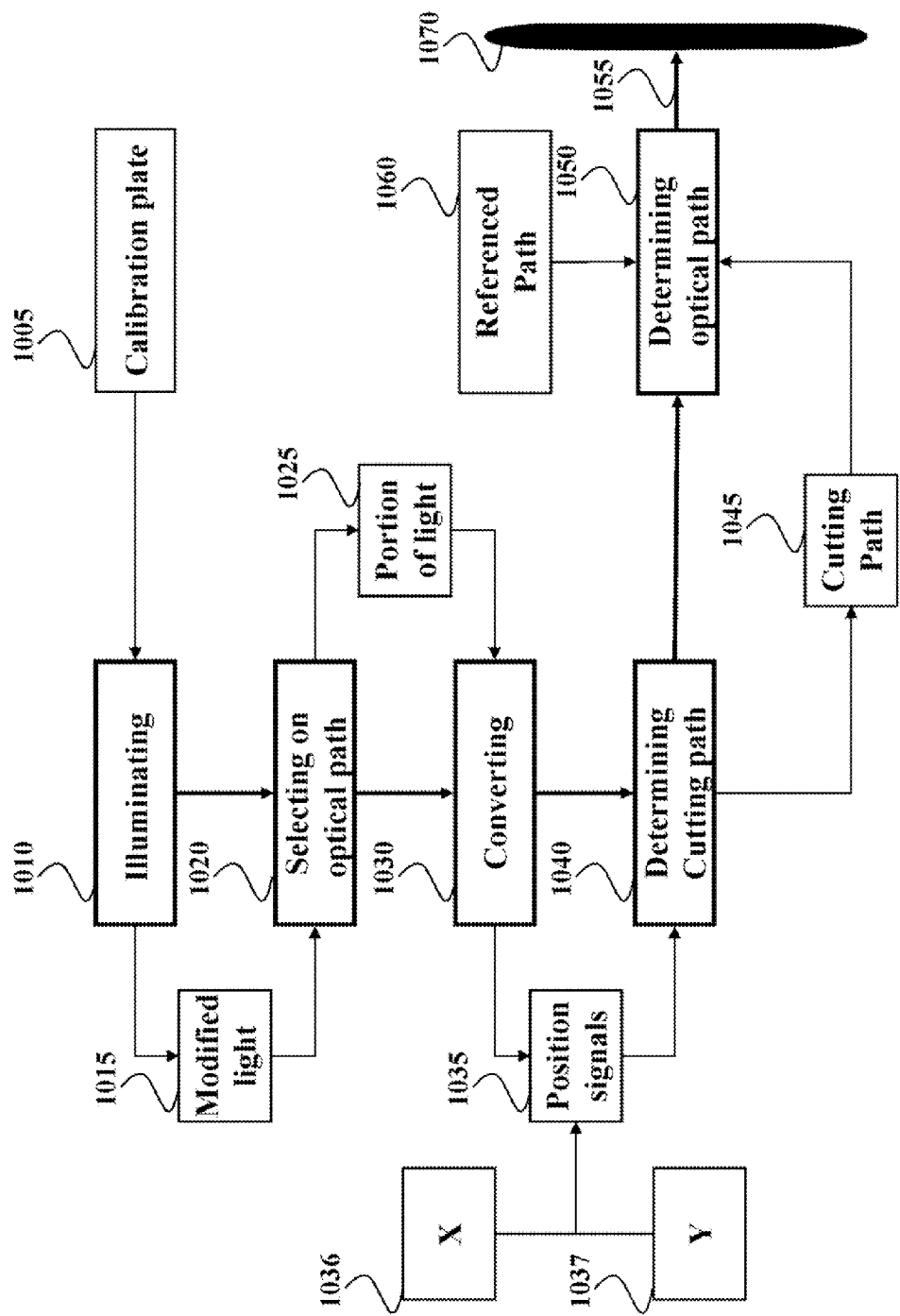
FIG. 10 is a block diagram of a method for calibrating a laser cutting machine according to one embodiment of the invention.

FIG. 10 shows a block diagram of a method for calibrating a laser cutting machine according to one embodiment of the invention. A calibration plate 1005, arranged to simulate a position of a workpiece, is illuminated 1010 to produce light 1015 modified by the calibration plate. A portion 1025 of the light propagated along an optical path of a laser beam is selected 1020, and is converted 1030 into a plurality of position signals 1035 using at least two quad photodiodes (QPDs). The plurality of the position signals includes at least two horizontal position signals 1036 and at least two vertical position signals 1037, such that phases of corresponding horizontal and phases of the corresponding vertical position signals are offset by 90 degrees.

A cutting path 1045 including a set of segments is determined 1040, wherein a length of each segment is determined based on a number of cycles in corresponding position signals, and determining a direction of each segment is determined based on signs of the phases of the corresponding position signals. The cutting path 1045 is compared 1050 with a referenced path 1060 to determined an error 1055. The error 1055 is used for calibrating 1070 the laser cutting machine.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system for calibrating a laser cutting machine, comprising:
    a calibration plate arranged to simulate a workpiece;
    a first quad photodiode (QPD) and a second QPD for converting light including an image of a portion of a surface of the calibration plate into a plurality of electrical signals, wherein the first and the second QPDs are positioned to receive the light propagated from the surface of the calibration plate through the optical path of the laser beam, wherein the calibration plate is illuminated from above by the cutting laser;
    an attenuator positioned on the optical path to reduce a power of the laser beam;
    an apodizing filter positioned on the optical path for converting an intensity) profile of the laser beam;
    a diverging lens positioned on the optical path for diverging the laser beam; and
    a deflector positioned on the optical path for directing the light toward the first and the second QPDs; and
    a control system for calibrating the laser cutting machine based on the plurality electrical signals.

2. The system of claim 1, wherein the surface of the calibration plate includes a calibration pattern of calibration marks arranged on a rectilinear grid.

3. The system of claim 2, wherein the calibration marks are circular having a diameter d and are spaced 2d apart in both a horizontal dimension and a vertical dimension.

4. The system of claim 3, wherein a position of the first QPD is offset from a position of the second QPD relative to the image of the portion of the calibration plate by m2d+d/2, m=0, 1, 2 . . . , in the horizontal dimension and by n2d+d/2, n=0, 1, 2 . . . , in the vertical dimension.

5. The system of claim 3, further comprising:
    a pair of lenses arranged as a Galilean telescope for matching the diameter d of the circular mark in the image of the portion of the calibration plate to a width of each quadrant of each QPDs.

6. The system of claim 2, wherein each calibration mark modifies an intensity of the light in a way different from an unmarked part of the surface.

7. The system of claim 6, wherein either calibration mark or an unmarked part of the surface includes a Lambertian reflector.

8. The system of claim 6, wherein the unmarked part of the surface includes opaque material and the calibration mark includes transparent material.

9. The system of claim 1, further comprising:
    a light source for illuminating the calibration plate with the light having a predetermined frequency; and
    an optical bandpass filter to limit the light impinging on the QPDs to the predetermined frequency.

10. The system of claim 1, further comprising:
a plurality of analog, to digital converters for determining digital values corresponding to the plurality of the electrical signals; and
a processor for determining, based on the digital values, at least a segment of a cutting path of a laser.

11. The system of claim 10, wherein the digital values of the first QPD include a value A corresponding to an upper-right quadrant, a value B corresponding to an upper-left quadrant, a value C corresponding to a lower-left quadrant, and a value D corresponding to a lower-right quadrant, wherein the processor combines the digital values to generate a horizontal (X) position signal and a vertical (Y) position signal as a function of the image of the portion of the calibration plate according to $$X=(B+C)-(A+D)/(A+B+C+D), \text{ and}$$

$$Y=(B+A)-(C+D)/(A+B+C+D).$$

12. The system of claim 11, wherein the digital values of the second QPD include a value A' corresponding to an upper-right quadrant, a value B' corresponding to an upper-left quadrant, a value C' corresponding to a lower-left quadrant, and a value D' corresponding to a lower-right quadrant, wherein the processor combines the digital values to generate a horizontal (X') position signal and a vertical (Y') position signal as a function of the image of the portion of the calibration plate according to $$X'=(B'+C')-(A'+D')/(A'+B'+C'+D'), \text{ and}$$

$$Y'=(B'+A')-(C'+D')/(A'+B'+C'+D'), \text{ and}$$

wherein the signals (X, X') and the signals (Y, Y') are periodic and separated by 90 degrees in phase, thus forming a pair of signals in quadrature.

13. The system of claim 12, wherein the processor determines a length of each segment of the cutting path based on a number of cycles in corresponding position signals, and determines a direction each segment of the cutting path based on a phase difference between the corresponding position signals.

14. The system of claim 13, the processor interpolates the corresponding position signals to increase a resolution of the length.

* * * * *